Dec. 22, 1970    M. J. BRIENZA ET AL    3,549,239
OPTICAL SIGNAL PROCESSOR
Filed Nov. 19, 1968    3 Sheets-Sheet 1

INVENTORS
MICHAEL J. BRIENZA
EDMOND B. TREACY

BY Donald J. Bradley
ATTORNEY

United States Patent Office 3,549,239
Patented Dec. 22, 1970

3,549,239
OPTICAL SIGNAL PROCESSOR
Michael J. Brienza and Edmond B. Treacy, Vernon, Conn., assignors to United Aircraft Corporation, East Hartford, Conn., a corporation of Delaware
Filed Nov. 19, 1968, Ser. No. 776,878
Int. Cl. G02b 27/38
U.S. Cl. 350—162                                    4 Claims

ABSTRACT OF THE DISCLOSURE

Two gratings with identical rulings are arranged with the ruled surfaces parallel and with the ruled elements on one grating parallel to those on the other. The grating pair can be used to compress optical chirped pulses, to generate chirped pulses out of short unchirped pulses, or to measure the phase structure of short pulses.

The invention herein described was made in the course of or under a contract or subcontract thereunder with the Government of the United States, Department of the Air Force.

BACKGROUND OF THE INVENTION

Field of the invention

This invention relates to the processing of short optical pulses, and particularly to the use of a pair of parallel gratings in an optical pulse compression system.

A pair of plane ruled gratings arranged in tandem with their faces and rulings parallel produces a time delay in an optical pulse that is a linearly increasing function of the wavelength of the optical pulse. The optical configuration of the gratings performs the function of a continuously variable dispersive delay line, and is capable of compressing optical chirped pulses, of generating chirped pulses out of short unchirped pulses, and of measuring the phase structure of short optical pulses.

The arrangement of gratings processes optical pulses so that the width of the pulse is limited only by the bandwidth of the pulse generator, generally a laser.

SUMMARY OF THE INVENTION

The basic elements of this invention are two gratings with identical rulings arranged with the ruled surfaces parallel and with the ruled elements on one grating parallel to those on the other.

In accordance with the invention, the grating pair is positioned with one grating placed in the path of an optical pulse. The second grating is positioned parallel to the first grating so that the optical pulse is diffracted from the first grating and impinges on the second grating, from which it is again diffracted to produce an output. In this embodiment the longer wavelength beam components will travel a longer path and will be delayed in time relative to the shorter wavelength beam components.

In accordance with another aspect of this invention, lenses are positioned at the input and output of the grating pair to expand the beam to use more of the grating surface and thereby increase the resolving power of the gratings.

The invention permits the generation of a time delay in optical pulses which is approximately a linear function of the wavelength.

DESCRIPTION OF THE PREFERRED EMBODIMENT

Frequency chirped optical pulses, that is, those with a time varying optical frequency, are produced by lasers such as mode-locked Nd:glass lasers, and account for output pulses being considerably longer in time than the minimum length that the laser bandwidth can allow. In optical radar systems chirped laser pulses are deliberately generated to improve the signal-to-noise ratio.

This invention provides an optical grating configuration which acts as a continuously variable dispersive optical delay line, and is capable of time compressing a chirped optical pulse, producing short pulses which are limited only by the laser bandwidth. This is accomplished by virtue of the fact that in a mode-locked pulse, the low optical frequencies precede the high optical frequencies in time, and the optical grating configuration of this invention delays the low frequencies relative to the high frequencies. By increasing the separation of the gratings and thereby increasing the amount of delay change with wavelength, it is also possible to chirp the pulse in the opposite sense, i.e., the short wavelengths will precede the longer wavelengths.

If the optical pulse contains a constant carrier frequency, the delay provided by the optical grating configuration will frequency sweep or chirp the pulse, again with the short wavelength components preceding the longer wavelengths.

If two identical pulses are reproduced, and the envelope shape of the pulses can be measured, the phase structure of the pulses may be analyzed.

The usefulness of the invention is due to the approximately linear relation between the transit time of the light through the system and the wavelength of the light. An alternate way of describing the function is to say that the phase shift through the system has a term that is quadratic in frequency. The invention may thus be used as a matched filter or dispersive compensator.

Figure 1:
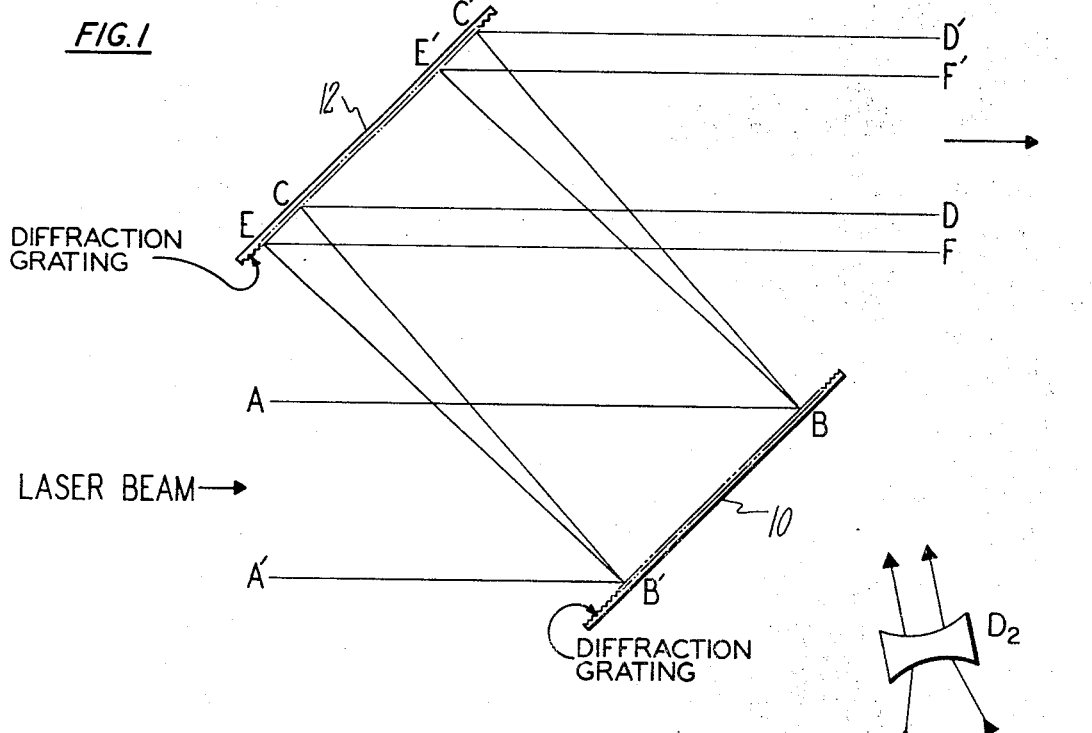
FIG. 1 shows schematically the geometrical arrangement of two reflection gratings.

Referring to FIG. 1, the principle of operation of the optical grating configuration is shown. An optical pulse or beam AA' as from a laser illuminates a reflecting diffraction grating 10 along BB'. If one wavelength component $\lambda$, of the laser beam is diffracted into the beam (BB'; CC') then a longer wavelength component $\lambda$ will be diffracted through a larger angle to a different beam (BB'; EE').

A second grating 12 identical to grating 10 is positioned exactly parallel to grating 10 and in the path of the reflected laser beam as shown in FIG. 1. The grating 12 restores each wavelength component to a beam parallel to the input beam. The shorter wavelength component beam is represented by (CC'; DD') and the longer wavelength component beam is represented by (EE'; FF'). It is clear from FIG. 1 that the longer wavelength beam has traveled a longer path and is thus delayed in time relative to the shorter wavelength beam. The output beam (E'C; F'D) contains all wavelength components present in the input beam within the wavelength range between $\lambda_1$ and $\lambda_2$.

The transit time of the beam is determined as a function of wavelength, and the relation between the transit time of $\lambda_1$ and the transit time of $\lambda_2$ is linear over a small fractional wavelength range. The relative time delay or difference in transit times is proportional to the dispersion of the gratings and to the spacing between the gratings 10 and 12. The spacing between the gratings may be made adjustable to vary the time delay.

As an illustration, using comercially available gratings of 1200 lines per millimeter, and a light wavelength of one micron, with an angle of incidence between the incoming laser beam and the perpendicular to grating 10 of 60°, the relative time delay between two wavelength components differing by 1 percent is about ½ picosecond per centimeter separation between gratings 10 and 12.

The apparatus of FIG. 1 may be used as a pulse compressor for chirped or frequency swept pulses, such as with optical pulses generated by a mode-locked laser. Since all laser materials exhibit normal refractive dispersion at the laser wavelength, ultrashort mode-locked pulses such as those generated by a Nd:glass laser are chirped, with the lower frequency components arriving before the higher frequency components. The apparatus of FIG. 1 may be adjusted to compensate the linear part of the frequency sweep and produce a shorter pulse. Pulses from a laser such as Nd:glass may be compressed up to a factor of about 30, thus increasing the power by the same factor.

Figure 2:
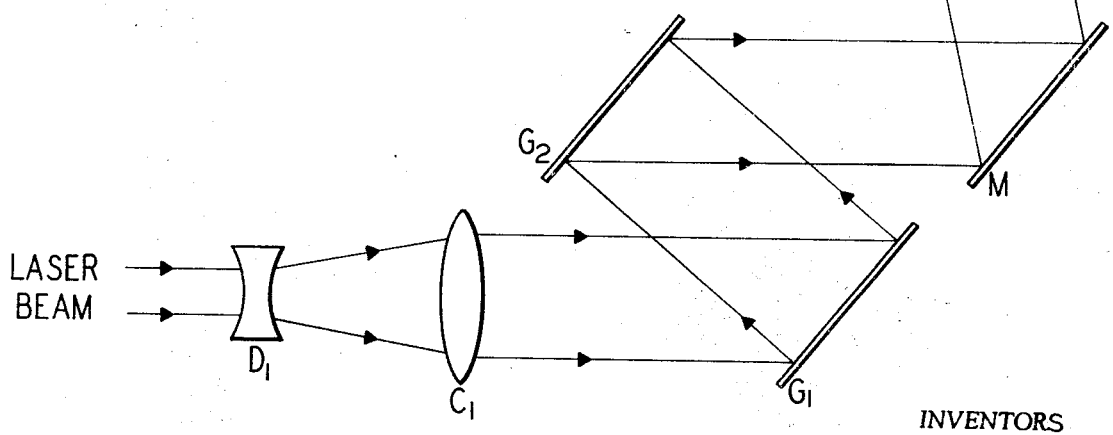
FIG. 2 shows schematically the geometrical arrangement of two gratings and associated lenses used for pulse compression.

FIG. 2 shows an arrangement for pulse compression. The input laser beam is transmitted through a diverging ocular lens $D_1$ and a double convex objective lens $C_1$ to grating $G_1$. Lenses $C_1$ and $D_1$ form a Galilean telescope that expands the beam to increase the resolving power of the gratings and to reduce the possibility of optical damage to the grating surfaces.

Gratings $G_1$ and $G_2$ are positioned and operate as described in connection with FIG. 1. A reflecting mirror M may be positioned in the path of and parallel to the beam from grating $G_2$ to reflect the output beam to a second Galilean telescope, $C_2$, $D_1$, which reduces the output beam. Mirror M and grating $G_2$ may be mounted on a single moving stage so that the distance between gratings $G_1$ and $G_2$ may be varied while the output beam reflected from mirror M remains fixed through lenses $C_2$, $D_2$.

If a pulse is to be amplified to a very high power, it may be useful to predistort the phase of the pulse. Passage through the amplifying medium will produce the same normal refractive dispersion as a mode-locked pulse produced by a laser oscillator, and the amplified pulse will be lengthened. By using the arrangement of FIG. 2, that is, by passing the pulse produced by the laser oscillator through the grating pair before amplification, and by setting the length between the gratings greater than is necessary for maximum pulse compression, the normal amplifier dispersion will shorten the pulse again to its minimum length.

For the case where the input laser beam is not chirped but contains a constant carrier frequency, a chirped pulse can be generated by the apparatus of this invention. The spectrum of any optical pulse contains both amplitude and phase contributions. If the beam or pulse has a constant carrier frequency, there is no spectral contribution from the phase function, but there is a spectral content from the amplitude function. When a beam of this type is transmitted to a pair of gratings as described in FIGS. 1 and 2, the spectrum of the beam is redistributed between the phase and amplitude components in a prescribed manner.

Specifically, in the case of chirped pulse generation, as the beam passes through the gratings, the low frequency components traverse a longer path than the high frequency components, and thus the high frequency components occur at an earlier time. Thus the beam spectrum becomes redistributed between the frequency and phase components, and the output pulse is longer in time and exhibits less spectral content in its envelope than the input beam. The spectral content has been transformed into phase components and exhibits itself in the frequency sweep of the carrier. A chirped pulse is produced having a large frequency sweep.

Another function of the grating pair is in measuring the phase structure of short optical pulses. If any device generates exactly reproducible ultrashort light pulses and a method exists for the measurement of the pulse envelope shape, the optical signal processor described here makes possible the measurement of the phase structure, i.e., carrier frequency modulation, of the pulses. In essence, the pulses are passed through the processor and the envelope is measured for various values of the distance between the gratings. Such a set of envelope measurements as a function of grating separation contains all the information necessary for reconstructing the phase function, which can then be computed. Thus the apparatus may be used as a phase structure analyzer for light pulses.

Either one or both reflection gratings in FIGS. 1 and 2 may be replaced by a transmission grating as shown in FIGS. 3 through 7.

Figure 3:
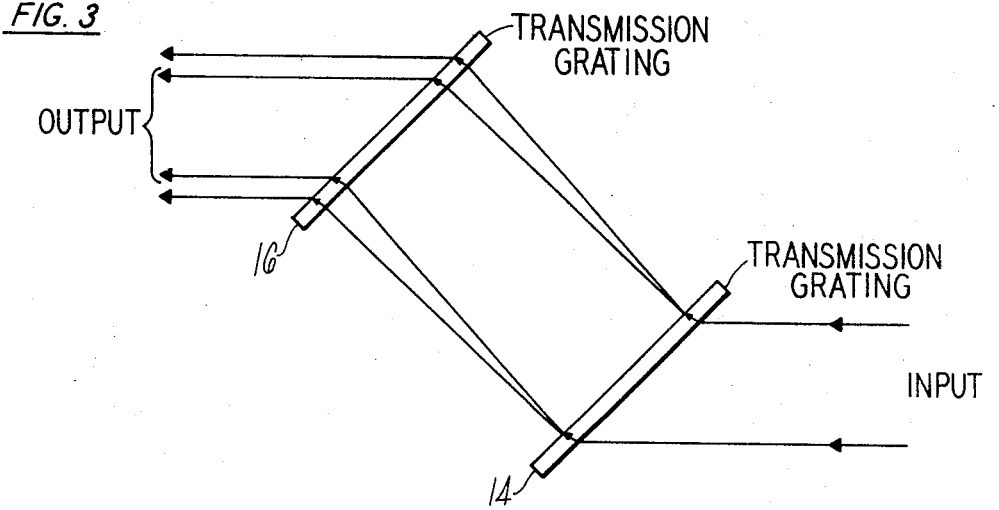
FIG. 3 shows schematically the use of two transmission gratings.

In FIG. 3 gratings 14 and 16 are both transmission gratings, the input wave being diffracted as it passes through each grating.

Figure 4:
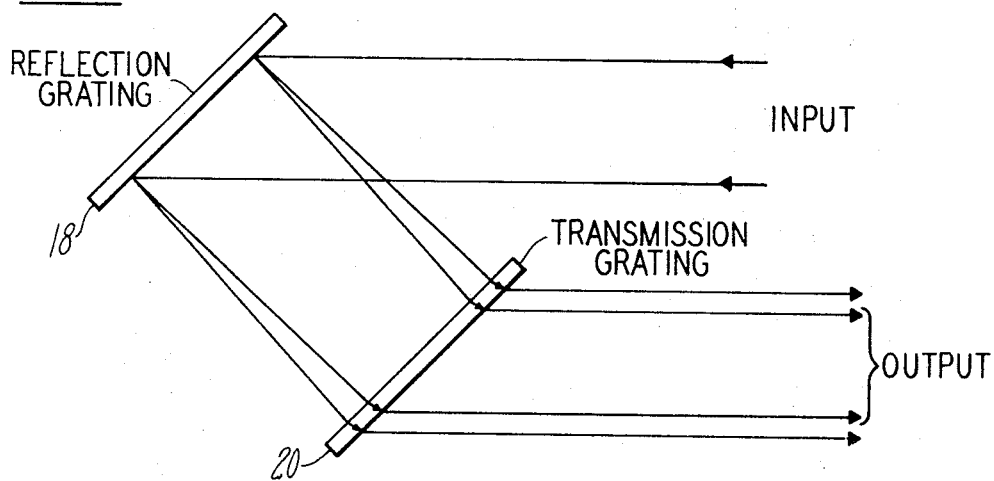
FIGS. 4 and 5 show schematically the use of one transmission grating and one reflection grating.
Figure 5:
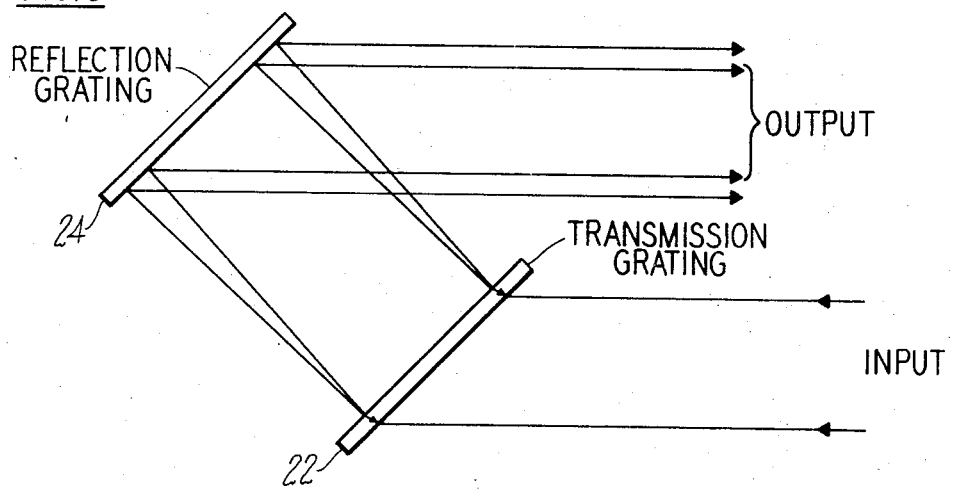

In FIG. 4, the input wave is diffracted by reflection grating 18 and then is diffracted again as it passes through transmission grating 20. FIG. 5 is the reverse situation to FIG. 4, the input wave first being diffracted as it passes through transmission grating 22 and being diffracted again as it encounters reflection grating 24.

Figure 6:
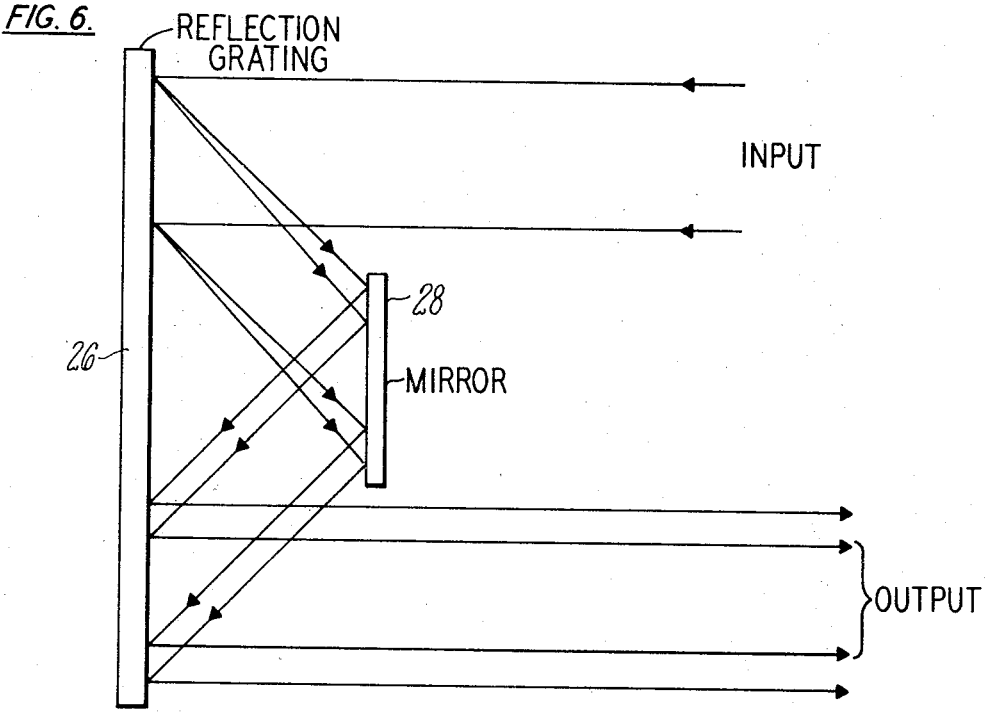
FIG. 6 shows schematically the use of onee reflection grating and a mirror.

FIG. 6 both reflection gratings are replaced by a single large reflection grating 26. The input wave is diffracted by the top portion of grating 26, and a mirror 28 is positioned in the path of the diffracted beam to reflect the beam toward the lower portion of grating 26, where it is again diffracted to produce the output beam as described previously. This embodiment avoids the problems associated with matching two identical gratings. It is apparent that the top and bottom portions of grating 26 may be two individual gratings if desired.

Figure 7:
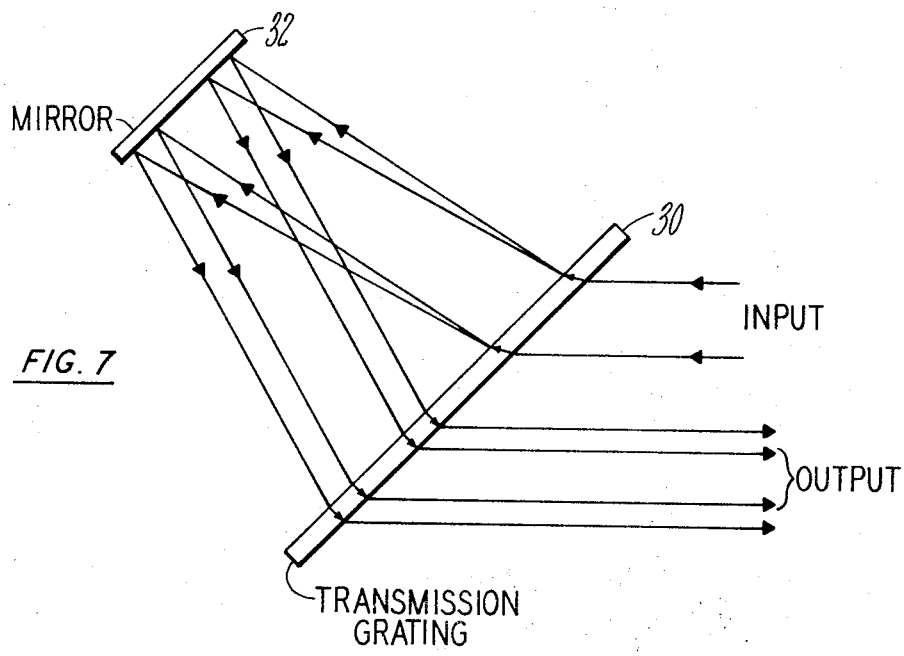
FIG. 7 shows schematically the use of one transmission grating and a mirror.

FIG. 7 utilizes a single transmission grating 30 and a mirror 32. The input beam is diffracted in passing through the top portion of grating 30, and is reflected from mirror 32 placed in the path of the beam to pass through the bottom portion of grating 30 where the beam is again diffracted. Again only one grating is required.

Thus by use of two parallel gratings or one grating and a mirror this invention will produce an optical pulse whose width is limited only by the bandwidth of the laser, and consequently of higher peak power and shorter duration.

Although the invention has been shown and described with respect to a preferred embodiment, it is understood that numerous changes may be made without departing from the scope of the invention, which is to be limited and defined only by the following claims.

1. A method for time compressing an optical pulse which contains a plurality of optical frequencies and in which the lower optical frequencies precede the higher optical frequencies in time, comprising the steps of:
  directing said optical pulse toward a first optical grating to diffract said pulse, and
  directing said diffracted optical pulse from said first optical grating toward a second optical grating substantially identical with said first grating and parallel thereto for further diffracting said pulse, said further diffracted pulse being propagated in a direction parallel to the direction of said optical pulse incident on said first grating.

2. A method for compressing an optical pulse as in claim 1 and including the steps of:
  expanding said optical pulse prior to directing said pulse toward said first grating,
  and reducing said optical pulse after said pulse is diffracted by said second grating.

3. A method for producing a chirped pulse from an optical pulse which contains a substantially constant carrier frequency comprising the steps of:
  directing the optical pulse toward a first optical grating to diffract said pulse, and
  directing said diffracted optical pulse from said first optical grating toward a second optical grating substantially identical with said first grating and parallel thereto for further diffracting said pulse, said further diffracted pulse being propagated in a direction parallel to the direction of said optical pulse incident on said first grating.

4. A method for processing the phase structure of an optical pulse which contains a plurality of optical frequencies comprising the steps of:

directing said optical pulse toward a first optical grating to diffract said pulse, and directing said diffracted optical pulse from said first optical grating toward a second optical grating substantially identical with said first grating and parallel thereto for further diffracting said pulse, said further diffracted pulse being propagated in a direction parallel to the direction of said optical pulse incident on said first grating.

References Cited

UNITED STATES PATENTS

| 2,818,765 | 1/1958 | Foster | 350—162 |
| 3,090,279 | 5/1963 | Chisholm | 356—111 |
| 3,426,294 | 2/1969 | Koester | 350—212W |

OTHER REFERENCES

Giordmaine et al., "Compression of Optical Pulses," IEEE Journal of Quantum Electronics, vol. QE–4, No. 5, May 1968, pp. 252–255.

JOHN K. CORBIN, Primary Examiner

U.S. Cl. X.R.

350—212